(No Model.)
E. A. WOOD.
COMBINED COCK AND SIPHON FOR STEAM PRESSURE GAGES.
No. 379,038. Patented Mar. 6, 1888.
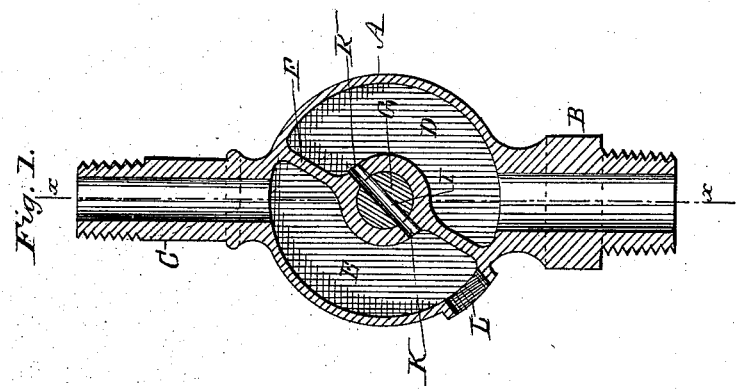
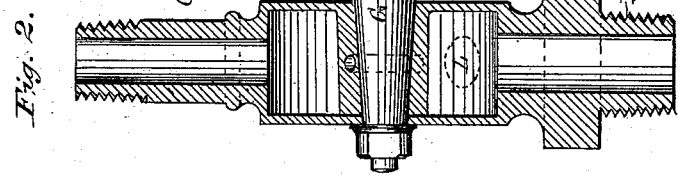
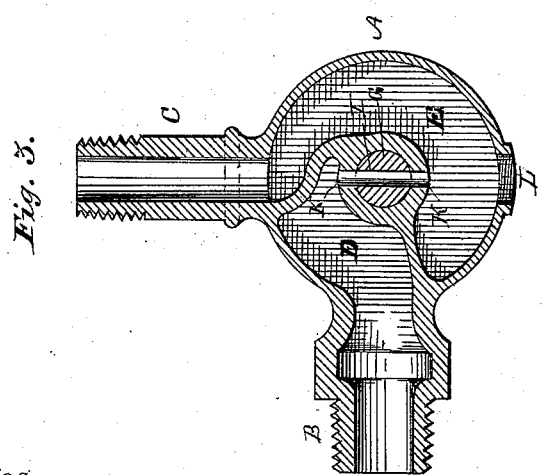
Witnesses:
Inventor:
E. A. Wood,
By
Attorney.

UNITED STATES PATENT OFFICE.

EDWIN A. WOOD, OF UTICA, NEW YORK.

COMBINED COCK AND SIPHON FOR STEAM-PRESSURE GAGES.

SPECIFICATION forming part of Letters Patent No. 379,038, dated March 6, 1888.

Application filed September 26, 1887. Serial No. 250,713. (No model.)

*To all whom it may concern:*

Be it known that I, EDWIN A. WOOD, a citizen of the United States of America, residing at Utica, in the county of Oneida and State of New York, have invented certain new and useful Improvements in Combined Cocks and Siphons for Steam-Gages, of which the following is a specification, reference being had therein to the accompanying drawings.

My invention relates to improvements in combined cocks and siphons for steam-gages, to be used in connection with steam-gages.

The object of my invention is to provide a cock and siphon for steam-gages which will more effectually prevent the steam from coming in contact with the gage-spring, and at the same time provide means by which the trap can be readily drained of water, so that the trap and gage will not be injured by the freezing of water contained therein, and also allow the trap to be readily cleaned of mud and other extraneous matter which may have entered.

Referring to the drawings, Figure 1 is a vertical sectional view. Fig. 2 is a similar view taken on the line $x\ x$ of Fig. 1. Fig. 3 is a vertical sectional view of a modification.

A indicates the condensing-chamber, which is cast integral with the pipes or extensions B and C, the former (pipe B) being adapted to connect with the interior of the boiler, and the latter (pipe C) with the steam-gage.

The condensing-chamber A is divided into two compartments or chambers, D and E, by the partition F, said partition being enlarged at its central portion and provided with a hole adapted to receive the tapering plug or key G, said plug or key being provided with an enlarged portion, H, by which it can be readily turned or manipulated. The plug G is provided with a hole, I, which registers with the holes or apertures K, formed in the enlarged portion of the partition when the plug is in the position shown in Fig. 1. By this arrangement the water can pass from the chamber D into the chamber E, and from thence into the pipe C and to the operating parts of the gage. Any steam which may have found its way into the chambers D and E is condensed, so that nothing but water is brought into contact with the spring of the gage.

L is an opening formed in the outer wall of the lower portion of the chamber E, which is closed by a screw-cap, plug, or cock. The object of this opening is to provide means by which the chamber E can be readily and entirely drained of water, so as to prevent the freezing of the same. The water in the chamber D and pipe B will readily find its way back into the boiler.

Another object of the opening L is to afford means by which the chamber E can be readily cleaned of mud, lime-scale, or other extraneous matter which may have found its way into said chamber.

In Fig. 3 I have shown my device in the form of a right angle, which in some cases may be preferred. The principle embraced in this form, however, is the same as that of the form already described, and shown in Figs. 1 and 2. It will be noticed that the water enters the chamber E near the bottom thereof and in a downward direction, so that any steam which may have found its way into the chamber E will be condensed by the water contained therein before it can reach the outlet-pipe C or come in contact with the spring of the gage.

What I claim is—

1. A steam cock and siphon combined for steam-gages, consisting of a chamber divided into two compartments by a perforated partition, said perforation opening into one compartment above the discharge-outlet into the other, and one of said compartments to communicate with the boiler and the other with the gage, the gage-outlet being located above the inlet-opening from the boiler, and a cock or plug for opening and closing the passage-way between the compartments, substantially as set forth.

2. In a combined cock and siphon for steam-gages, a chamber divided into two compartments by a perforated partition, the receiving end of the perforation located above the discharge end, an inlet-pipe entering the bottom of one compartment and an outlet-pipe extending from the top of the other, to communicate with the gage, and a hand cock or valve for controlling the passage-way between the two compartments, as set forth.

3. In a combined cock and siphon for steam-gages, a chamber divided into two compartments by a perforated partition, the receiving end of the perforation located above the discharge end, an inlet-pipe, an outlet-pipe extending from the top of one compartment above the inlet of the other compartment and communicating with the gage, and a trap or opening in the outlet-compartment by which it can be drained, as set forth.

In testimony whereof I affix my signature in presence of two witnesses.

EDWIN A. WOOD.

Witnesses:
W. E. WOOD,
ALLEN G. WOOD.